(12) United States Patent
Ishizuka et al.

(10) Patent No.: US 12,319,215 B2
(45) Date of Patent: Jun. 3, 2025

(54) VEHICLE STRUCTURE

(71) Applicant: SUMITOMO HEAVY INDUSTRIES, LTD., Tokyo (JP)

(72) Inventors: Masayuki Ishizuka, Ehime (JP); Satoshi Shimizu, Ehime (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 305 days.

(21) Appl. No.: 17/973,211

(22) Filed: Oct. 25, 2022

(65) Prior Publication Data

US 2023/0044854 A1 Feb. 9, 2023

Related U.S. Application Data

(63) Continuation of application No. PCT/JP2020/045852, filed on Dec. 9, 2020.

(30) Foreign Application Priority Data

Apr. 27, 2020 (JP) ................................ 2020-078580

(51) Int. Cl.
*B60R 16/02* (2006.01)
*B60R 19/18* (2006.01)
*B62D 25/02* (2006.01)

(52) U.S. Cl.
CPC .......... *B60R 19/18* (2013.01); *B60R 16/0215* (2013.01); *B60R 2019/1806* (2013.01); *B62D 25/025* (2013.01)

(58) Field of Classification Search
CPC ....... B60R 19/18; B60R 19/023; B60R 19/42; B60R 19/483; B60R 2019/1806;
(Continued)

(56) References Cited

U.S. PATENT DOCUMENTS 5,722,708 A * 3/1998 Jonsson .................. B60R 19/18
293/122
11,518,325 B2 * 12/2022 Nogiwa ............... B21D 26/033
(Continued)

FOREIGN PATENT DOCUMENTS

CN 106114648 A * 11/2016 ........... B62D 21/157
DE 1859944 U 10/1962
(Continued)

OTHER PUBLICATIONS

Inami et al. (JP 59143776 A), machine translation (Year: 1984).*
(Continued)

*Primary Examiner* — Amy R Weisberg
*Assistant Examiner* — Wenwei Zhuo
(74) *Attorney, Agent, or Firm* — Michael Best & Friedrich LLP

(57) ABSTRACT

Provided is a vehicle structure including: a pipe member forming a part of a frame of a vehicle; and a wire-shaped body having flexibility, in which the pipe member includes a pipe portion forming a pipe shape and a flange portion formed to protrude from the pipe portion, and is formed of one member in which the pipe portion and the flange portion are continuous with each other, and the wire-shaped body is disposed in at least one of a first state where the wire-shaped body is disposed along the flange portion and a second state where the wire-shaped body strides over the flange portion.

17 Claims, 16 Drawing Sheets

(58) Field of Classification Search
CPC .............. B60R 16/0215; B60R 13/06; B60R 2013/046; B60R 2013/0287; B62D 25/025; B62D 25/04; B62D 21/04; B62D 21/15; B62D 21/152; B62D 21/157; B62D 23/005; B62D 21/17
USPC ......... 293/102, 128, 122, 4, 117; 296/203.1, 296/203.2, 203.3, 203.4, 204, 205, 209, 296/187.03, 187.09, 187.12, 193.06
See application file for complete search history.

(56) References Cited

U.S. PATENT DOCUMENTS

| | | | | |
|---|---|---|---|---|
| 11,845,121 | B2* | 12/2023 | Saika | B21D 37/16 |
| 2010/0186473 | A1* | 7/2010 | Mizumura | B21D 26/033 |
| | | | | 72/60 |
| 2013/0328354 | A1* | 12/2013 | Bauer | B60R 16/0215 |
| | | | | 296/199 |
| 2017/0043735 | A1* | 2/2017 | Yamaguchi | B60R 19/18 |
| 2017/0129429 | A1* | 5/2017 | Handing | B60R 19/18 |
| 2017/0129431 | A1 | 5/2017 | Rabe et al. | |
| 2018/0361458 | A1* | 12/2018 | Ishizuka | B21D 26/037 |
| 2020/0172169 | A1* | 6/2020 | Ikeda | B62D 25/04 |
| 2022/0274651 | A1* | 9/2022 | Shimizu | B21D 22/02 |
| 2023/0101313 | A1* | 3/2023 | Otsuka | B21D 37/08 |
| | | | | 29/897.2 |

FOREIGN PATENT DOCUMENTS

| | | |
|---|---|---|
| DE | 102014207745 A1 | 11/2015 |
| EP | 1253067 A1 | 10/2002 |
| JP | 59143776 A * | 8/1984 |
| JP | 2009-056857 A | 3/2009 |
| JP | 2012-000654 A | 1/2012 |
| JP | 2014227153 A * | 12/2014 |
| JP | 2016-020133 A | 2/2016 |
| JP | 2019-014461 A | 1/2019 |

OTHER PUBLICATIONS

International Search Report issued in Application No. PCT/JP2020/045852, mailed Jan. 19, 2021.
Search Report issued in European Application No. 20933128.9-1015, dated Sep. 21, 2023.
Examiner's Report issued in Canadian Application No. 3,169,600, dated Oct. 11, 2023.
Examiner's Report issued in Canadian Application No. 3,169,600, dated Oct. 21, 2024.

* cited by examiner

FIG. 4
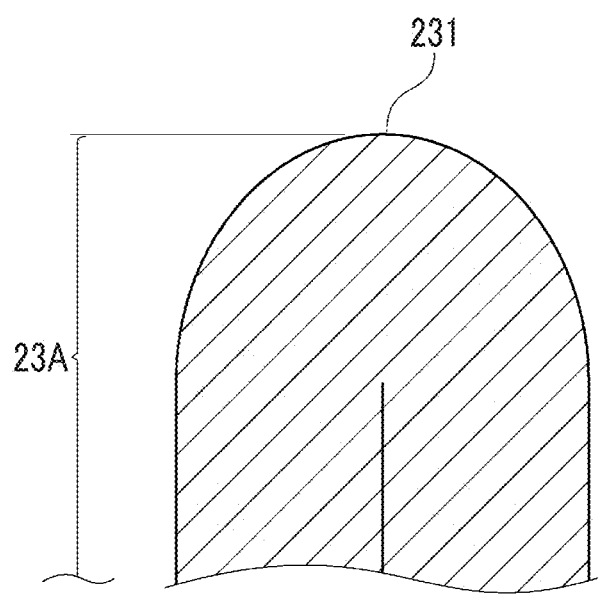
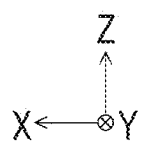

VEHICLE STRUCTURE

RELATED APPLICATIONS

The contents of Japanese Patent Application No. 2020-078580, and of International Patent Application No. PCT/JP2020/045852, on the basis of each of which priority benefits are claimed in an accompanying application data sheet, are in their entirety incorporated herein by reference.

BACKGROUND

Technical Field

Certain embodiments of the present invention relate to a vehicle structure.

Description of Related Art

In the related art, a bumper that receives an impact at the time of collision is provided on each of the front and the rear of an automobile. As the bumper, for example, a bumper including a bumper reinforcement extending in a vehicle width direction and a crash box that supports the bumper reinforcement has been known (for example, refer to the related art). Two bumper reinforcements disclosed in the related art are disposed on upper and lower sides. Then, the bumper reinforcement on the upper side has, for example, a constant cross section of a substantially eye shape and is made of an extruded aluminum material.

SUMMARY

According to an embodiment of the present invention, there is provided a vehicle structure of the present invention includes: a pipe member forming a part of a frame of a vehicle; and a wire-shaped body having flexibility.

The pipe member includes a pipe portion forming a pipe shape and a flange portion formed to protrude from the pipe portion, and is formed of one member in which the pipe portion and the flange portion are continuous with each other.

The wire-shaped body is disposed in at least one of a first state where the wire-shaped body is disposed along the flange portion and a second state where the wire-shaped body strides over the flange portion.

BRIEF DESCRIPTION OF THE DRAWINGS

FIG. 4 is an enlarged view of a region [B] surrounded by an alternate long and short dashed line in FIG. 3.

DETAILED DESCRIPTION

Figure 1:
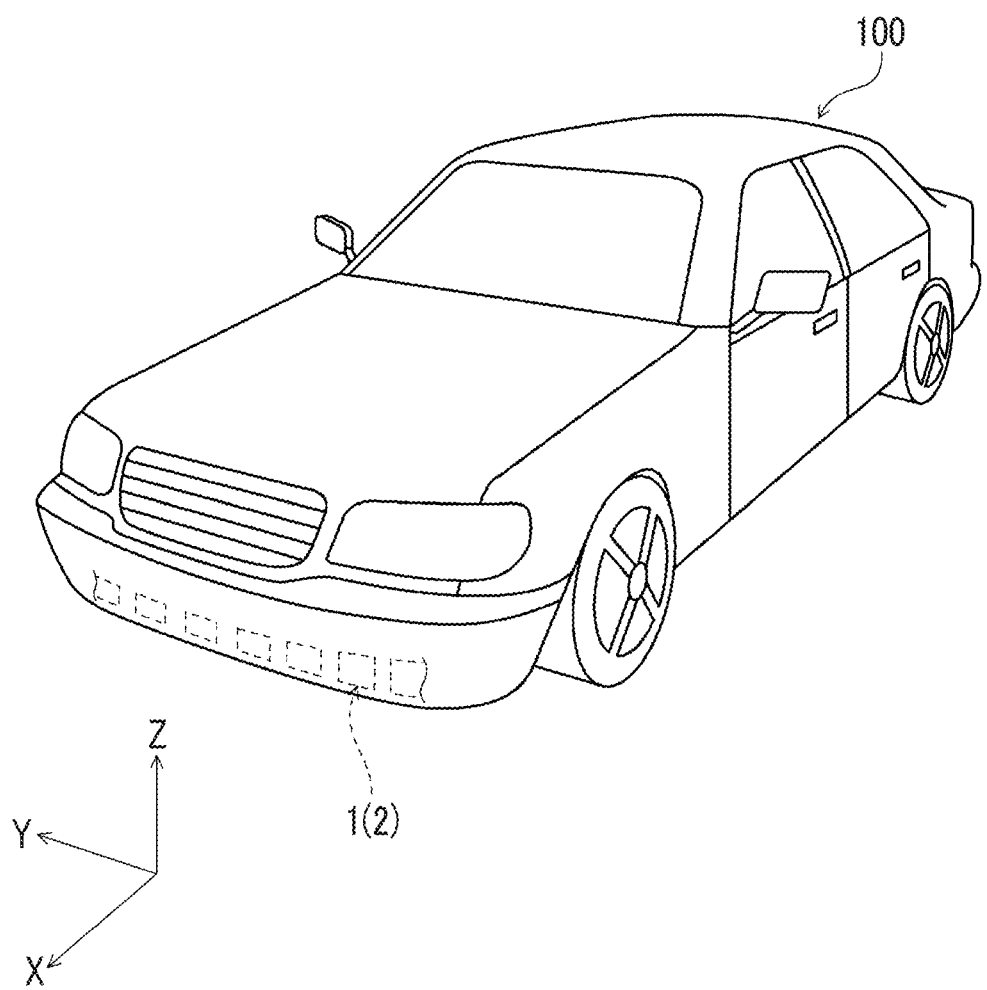
FIG. 1 is a perspective view showing one example of an automobile into which a vehicle structure (first embodiment) of the present invention is built.
Figure 2:
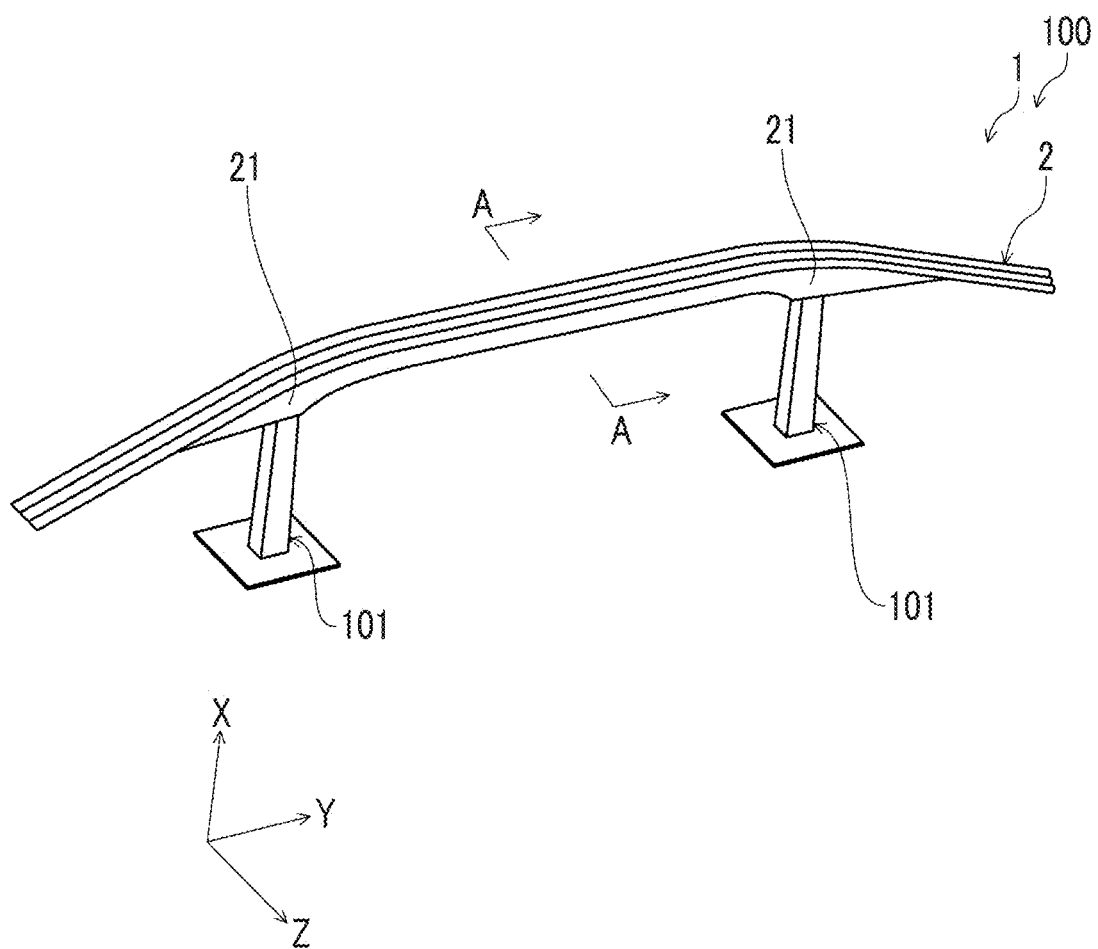
FIG. 2 is a perspective view of the vehicle structure in FIG. 1.

A protrusion protruding outward (upward or downward) and including a sharp edge is formed in the bumper reinforcement on the upper side (refer to a "first bumper reinforcement 17" in FIGS. 1 and 2 of the related art). For this reason, when a cable (harness) is routed, in order to prevent damage to the cable caused by contact with the edge, the cable should be separated from the protrusion as much as possible, and a disposition location of the cable is limited by that amount.

It is desirable to provide a vehicle structure in which the degree of freedom in the disposition of a wire-shaped body with respect to a pipe member is high.

According to the present invention, since the pipe member is formed of one member in which the pipe portion and the flange portion are continuous with each other, the pipe member has a rounded shape as a whole. Accordingly, even when the wire-shaped body is disposed in one of the first state and the second state, damage to the wire-shaped body caused by contact with the flange portion is prevented. Accordingly, the wire-shaped body can be freely disposed regardless of the position with respect to the pipe portion, namely, the degree of freedom in the disposition of the wire-shaped body with respect to the pipe member is high.

Hereinafter, a vehicle structure of the present invention will be described in detail based on exemplary embodiments shown in the accompanying drawings.

First Embodiment

A first embodiment of the vehicle structure of the present invention will be described with reference to FIGS. 1 to 6. Incidentally, hereinafter, for convenience of description, a full length direction of a vehicle is an X-axis direction, a vehicle width direction of the vehicle is a Y-axis direction, and a vehicle height direction of the vehicle is a Z-axis direction. In addition, a positive side in the X-axis direction is a front side of the vehicle, a negative side in the X-axis direction is a rear side of the vehicle, a positive side in the Y-axis direction is a right side of the vehicle, a negative side in the Y-axis direction is a left side of the vehicle, a positive side in the Z-axis direction is an upper side of the vehicle, and a negative side in the Z-axis direction is a lower side of the vehicle.

Figure 3:
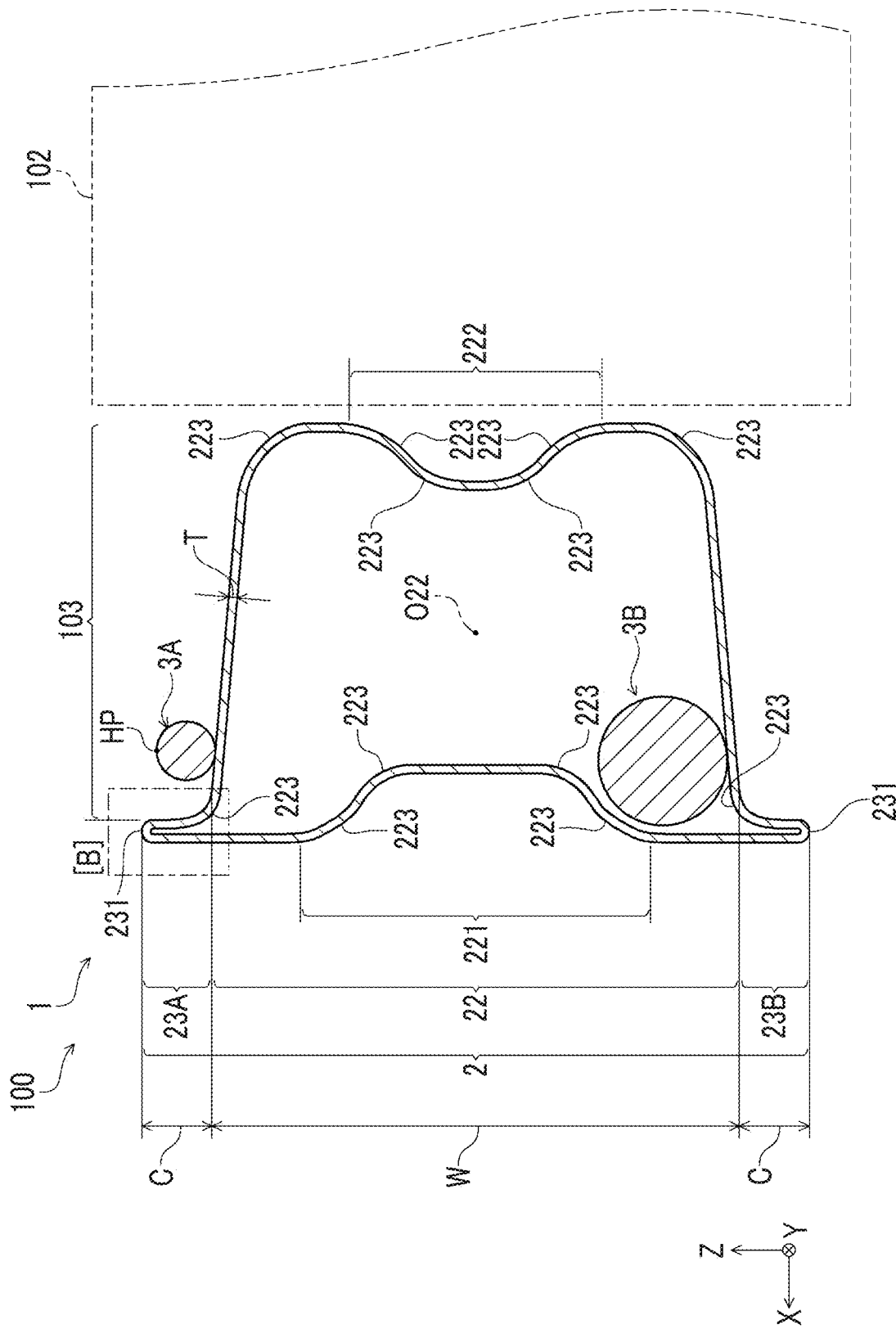
FIG. 3 is a cross-sectional view taken along line A-A in FIG. 2.

As shown in FIGS. 1 and 2, in the present embodiment, a vehicle structure 1 is mounted and used in an automobile 100 that is a passenger vehicle. As shown in FIG. 3, the vehicle structure 1 includes a pipe member 2, a first wire-shaped body 3A, and a second wire-shaped body 3B.

The pipe member 2 is a member that is disposed parallel to an X-Y plane to form a part of a frame of the vehicle. In the present embodiment, the pipe member 2 is applied to a front bumper of the automobile (passenger vehicle) 100. In this case, the pipe member 2 is called, for example, a "bumper reinforcement" or a "bumper beam". In addition, the pipe member 2 may be used as a "first bumper" that receives an impact generated at the time of collision from the positive side in the X-axis direction, or may be used as a "second bumper (leg protection beam) that prevents an obstacle or the like from intruding from the positive side in the X-axis direction.

As shown in FIG. 2, the pipe member 2 includes two curved portions 21 that are curved (or bent) in the middle of the pipe member 2 in a longitudinal direction. Then, the pipe member 2 is supported by a crash box 101 on the negative side of each of the curved portions 21 in the X-axis direction.

Incidentally, the pipe member 2 is not limited to being applied to the front bumper, but may be applied to a rear bumper.

As shown in FIG. 3, the pipe member 2 includes a pipe portion 22 forming a pipe shape and a flange portion (upper flange portion) 23A and a flange portion (lower flange portion) 23B that are integrally formed to protrude from an outer peripheral portion of the pipe portion 22.

As will be described later, the pipe member 2 is formed by shaping one base material 2' having a cylindrical shape. Then, after this shaping, the pipe member 2 is in a state where the pipe portion 22, the flange portion 23A, and the flange portion 23B are continuously formed. As described above, the pipe member 2 is formed of one member. Accordingly, in the pipe member 2, the mechanical strength against external force is, for example, 1.5 times or more higher than the mechanical strength of the pipe member 2 formed of, for example, a joint body formed by joining a plurality of members.

The pipe portion 22 has a higher occupancy ratio (volume ratio) than that of the flange portion 23A or the flange portion 23B in the pipe member 2. The pipe portion 22 includes a first recessed portion 221 provided on the positive side in the X-axis direction and a second recessed portion 222 provided on the negative side in the X-axis direction.

The first recessed portion 221 is recessed and deformed toward the negative side in the X-axis direction and is formed in a groove shape along a center axis O22 direction of the pipe portion 22.

The second recessed portion 222 is recessed and deformed toward the positive side in the X-axis direction and, similarly to the first recessed portion 221, is formed in a groove shape along the center axis O22 direction of the pipe portion 22.

The pipe portion 22 has a non-circular pipe shape (ring shape) having a rounded cross-sectional shape because of the first recessed portion 221 and the second recessed portion 222 having such shapes. Accordingly, the mechanical strength of the pipe member 2 can be improved.

Incidentally, a magnitude relationship in depth or a magnitude relationship in width between the first recessed portion 221 and the second recessed portion 222 is not particularly limited.

The flange portion 23A is provided on an upper side of the pipe portion 22, and the flange portion 23B is provided on a lower side. Then, the flange portion 23A and the flange portion 23B are formed to protrude in opposite directions. Namely, the flange portion 23A is formed to protrude upward (the positive side in the Z-axis direction), and the flange portion 23B is formed to protrude downward (the negative side in the Z-axis direction). Accordingly, the pipe member 2 has a vertically symmetrical shape and thus can be used even when the pipe member 2 is turned upside down (regardless of an up-down direction).

As shown in FIG. 3, in the present embodiment, the pipe member 2 is used in the automobile 100 in a state where a protruding direction of the flange portion 23A faces upward and a protruding direction of the flange portion 23B faces downward. In addition, the flange portion 23A and the flange portion 23B are located on a foremost surface of the pipe member 2, together with the pipe portion 22. Because of such a usage state, for example, when the automobile 100 collides head-on, an impact of the collision can be received in as wide an area (range) as possible, so that deformation such as unintentional bending of the pipe member 2 can be sufficiently prevented or prevented. Accordingly, the safety of passengers of the automobile 100 is secured.

Since the flange portion 23A and the flange portion 23B have the same configuration except that the locations of formation are different from each other, the flange portion 23A will be representatively described.

The flange portion 23A is an overlapping portion in which the base material 2' that becomes the pipe member 2 is crushed and parts of a pipe wall of the base material 2' overlap each other in the X-axis direction. Accordingly, the mechanical strength of the flange portion 23A itself is improved. Incidentally, the parts of the pipe wall may be in contact with each other or may be separated from each other.

The flange portion 23A is formed in a plate shape over a full length of the pipe portion 22 along the center axis O22 direction of the pipe portion 22. Accordingly, the pipe member 2 secures a uniform mechanical strength along the longitudinal direction and thus can sufficiently receive an impact regardless of collision location.

In addition, when a protrusion amount of the flange portion 23A is C and a thickness of the pipe wall of the pipe member 2 is T, the protrusion amount C is preferably in a range of from smaller one of 0.5 times the thickness T and 1 mm to 20 times the thickness, more preferably 1 mm to 50 mm. Accordingly, when the pipe member 2 is shaped from the base material 2', the flange portion 23A can be sufficiently formed by bending the pipe wall of the base material 2' without excess or deficiency.

In addition, when a width of the pipe portion 22 along the protruding direction of the flange portion 23A is W, the width W gradually decreases toward the negative side in the X-axis direction. Then, the protrusion amount C is preferably in a range of from smaller one of 0.01 times a maximum value of the width W and 1 mm to 1 time the maximum value, more preferably 1 mm to 50 mm. When the pipe member 2 is mounted in the automobile 100, in a case where a length (width) of the pipe member 2 in the Z-axis direction has been determined, it is preferable that as large the width W (maximum value) as possible is secured. By causing a magnitude relationship between the protrusion amount C and the width W to satisfy the above numerical range, as large the width W as possible can be secured, and the mechanical strength of the pipe member 2 can be improved.

Each of the first wire-shaped body 3A and the second wire-shaped body 3B is a wire-shaped body having flexibility. As shown in FIG. 3, in the present embodiment, as one example, the first wire-shaped body 3A is thinner than the second wire-shaped body 3B. Incidentally, the first wire-shaped body 3A and the second wire-shaped body 3B are not particularly limited, and examples thereof include an electric cable (harness), a tube, and the like. The harness is also called a wire harness. In addition, examples of the tube include tubes for supplying various liquids such as cooling water, oil, and a washer liquid and the like.

Both the first wire-shaped body 3A and the second wire-shaped body 3B are disposed in at least one of a first state where the first wire-shaped body 3A and the second wire-shaped body 3B are disposed along the flange portion 23A (flange portion 23B) and a second state where the first wire-shaped body 3A and the second wire-shaped body 3B stride over the flange portion 23A or the flange portion 23B. In the configuration shown in FIG. 3, the first wire-shaped body 3A is disposed in the first state outside of the pipe portion 22. On the other hand, the second wire-shaped body 3B is disposed in the first state inside the pipe portion 22. Incidentally, each of the first wire-shaped body 3A and the second wire-shaped body 3B may meander.

In addition, as shown in FIG. 4, the flange portion 23A includes an end portion 231 that is rounded along a circumferential direction of the pipe member 2. The pipe portion 22 includes a plurality of rounded portions 223 that are rounded along the circumferential direction, at an outer peripheral portion and at an inner peripheral portion. The reason that the pipe member 2 has a rounded shape as a whole is that the pipe member 2 is formed by shaping one base material 2' having a cylindrical shape.

As shown in FIG. 3, for example, a traveling structure 102 such as a radiator or a battery used for the traveling of the automobile 100 is disposed on the negative side of the pipe member 2 in the X-axis direction.

Then, a dead space 103 between the traveling structure 102 and the flange portion 23A of the pipe member 2 can be used to dispose the first wire-shaped body 3A in the dead space 103. In this case, since the first wire-shaped body 3A is desired to be disposed away from the traveling structure 102, it is preferable that the first wire-shaped body 3A is disposed close to the flange portion 23A.

As described above, the flange portion 23A includes the end portion 231 that is rounded. Accordingly, even when the first wire-shaped body 3A in the first state is disposed close to the flange portion 23A outside the pipe portion 22, damage to the first wire-shaped body 3A caused by contact with the end portion 231 is prevented. Therefore, in the vehicle structure 1, as long as the first wire-shaped body 3A is separated from the traveling structure 102, the first wire-shaped body 3A can be freely disposed regardless of the position on the pipe portion 22, namely, the degree of freedom in the disposition of the first wire-shaped body 3A with respect to the pipe member 2 is high.

Incidentally, it is preferable that a highest point HP of the first wire-shaped body 3A is the same as or lower than the height of the end portion 231 of the flange portion 23A. Accordingly, the first wire-shaped body 3A can be protected by the flange portion 23A.

In addition, after the first wire-shaped body 3A is disposed, it is preferable that the first wire-shaped body 3A is fixed using a clamp member or the like. Accordingly, the positional shift of the first wire-shaped body 3A is prevented even while the automobile 100 travels.

Since the plurality of rounded portions 223 are also formed inside the pipe portion 22, damage to the second wire-shaped body 3B caused by contact with the inner peripheral portion of the pipe portion 22 is prevented. Accordingly, the second wire-shaped body 3B can be freely disposed regardless of the position inside the pipe portion 22, namely, the degree of freedom in the disposition of the second wire-shaped body 3B with respect to the pipe member 2 is high.

In addition, after the second wire-shaped body 3B is disposed, it is preferable that the second wire-shaped body 3B is fixed using a clamp member or the like. Accordingly, the positional shift of the second wire-shaped body 3B is prevented even while the automobile 100 travels.

Next, a method for manufacturing the pipe member 2 will be described with reference to FIGS. 5 and 6.

In the manufacturing method, a shaping device 5A is used. The shaping device 5A includes an upper die 51, a lower die 52, a gas supply portion 53, a heating portion 54, a cooling portion 55, a drive unit 56, and a control unit 57.

The lower die 52 is fixed and the upper die 51 is supported so as to be able to approach and separate from the lower die 52. As shown in FIG. 5, in a die opening state of the upper die 51 and the lower die 52, the base material 2' can be disposed between the upper die 51 and the lower die 52. In addition, as shown in FIG. 6, in a die clamping state, the upper die 51 and the lower die 52 can define a first cavity 58 for forming the pipe portion 22, a second cavity 59A for forming the flange portion 23A, and a second cavity 59B for forming the flange portion 23B.

The gas supply portion 53 supplies high-pressure air into the base material 2'. The gas supply portion 53 is not particularly limited in terms of configuration and can be configured to include, for example, a compressor.

The heating portion 54 heats the base material 2'. The heating portion 54 is not particularly limited in terms of configuration and can be configured to include, for example, two electrodes that are electrically connected to the base material 2' and a voltage application unit that applies a voltage between the electrodes. Accordingly, the base material 2' can be heated and softened by energizing the base material 2'.

The cooling portion 55 rapidly cools the pipe member 2 (base material 2'). The cooling portion 55 is not particularly limited in terms of configuration and can be configured to include, for example, a flow path which is provided in each of the upper die 51 and the lower die 52 and through which a refrigerant passes. Then, when the refrigerant passes through the flow paths, the pipe member 2 can be rapidly cooled on each of the upper die 51 and the lower die 52. Incidentally, the refrigerant may be either of a liquid and a gas. In addition, it is preferable that the cooling portion 55 is built in, for example, the lower die 52. Accordingly, the rapid cooling of the pipe member 2 can be quickly performed.

The drive unit 56 can move the upper die 51 to cause the upper die 51 to approach and separate from the lower die 52. Accordingly, switching between the die opening state and the die clamping state can be performed. The drive unit 56 is not particularly limited in terms of configuration and can be configured to include, for example, a motor, a ball screw connected to the motor, and a linear guide connected to the ball screw.

The control unit 57 controls operation of the gas supply portion 53, the heating portion 54, the cooling portion 55, and the drive unit 56. The control unit 57 is not particularly limited in terms of configuration and can be configured to include, for example, a central processing unit (CPU) and various memories.

The shaping device 5A operates as follows.

Figure 5:
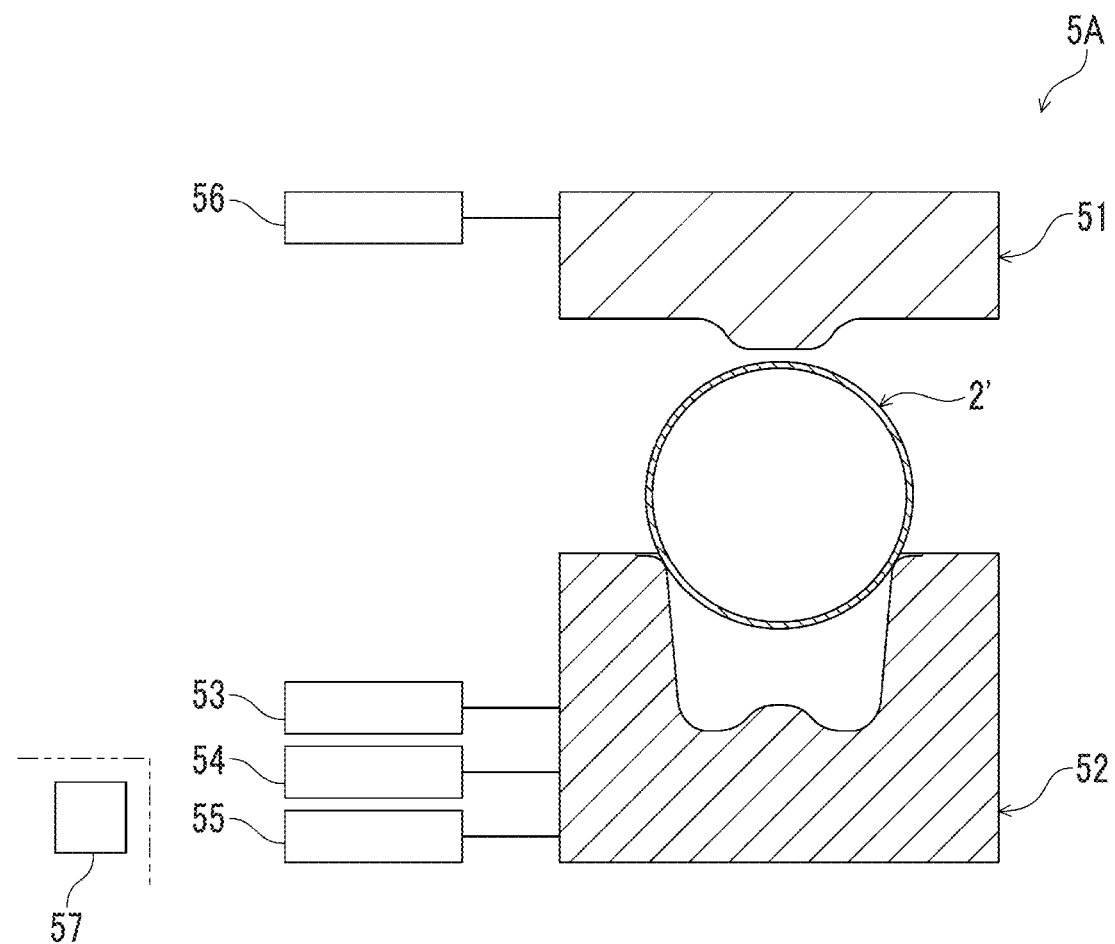
FIG. 5 is a view (die opening state) showing a process (one example) of manufacturing a pipe member included in the vehicle structure shown in FIG. 2, in order.

First, as shown in FIG. 5, the upper die 51 and the lower die 52 are set to the die opening state, and the base material 2' is disposed between the upper die 51 and the lower die 52. Next, the heating portion 54 is operated in the die opening state. Accordingly, the base material 2' can be softened.

Next, the upper die 51 is approached to the lower die 52. This state has not reached the die clamping state shown in FIG. 6 and is a state where a gap is formed between the upper die 51 and the lower die 52. Then, the gas supply portion 53 is operated to perform primary blowing. Accordingly, a part of the base material 2' bulges and enters the gap between the upper die 51 and the lower die 52. The bulged part of the base material 2' becomes the flange portion 23A and the flange portion 23B later.

Figure 6:
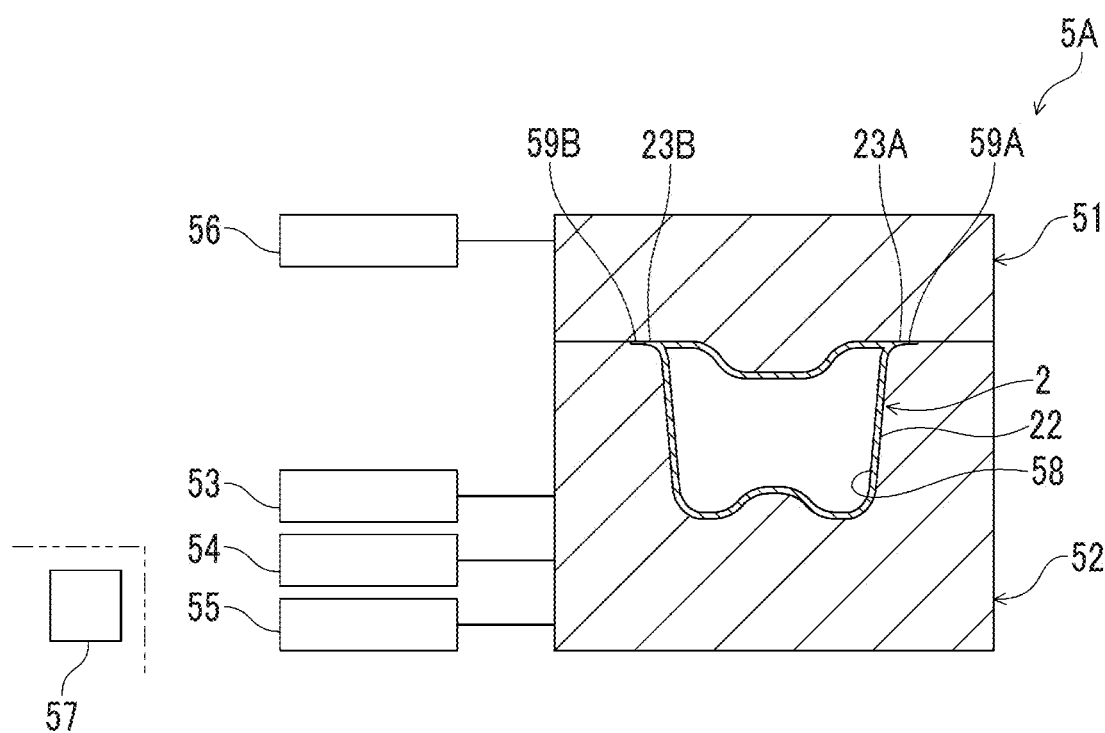
FIG. 6 is a view (die clamping state) showing the process (one example) of manufacturing the pipe member included in the vehicle structure shown in FIG. 2, in order.

Next, the upper die 51 and the lower die 52 are set to the die clamping state shown in FIG. 6. Accordingly, the flange portion 23A and the flange portion 23B are formed. Then, the gas supply portion 53 is operated to perform secondary blowing. Accordingly, the base material 2' can be deformed into the shape of the pipe member 2, namely, becomes the pipe member 2 including the pipe portion 22, the flange portion 23A, and the flange portion 23B.

In addition, the pipe member 2 is rapidly cooled by the cooling portion 55 in synchronization with the setting of the die clamping state. Accordingly, austenite is transformed into martensite in the pipe member 2.

Next, the die opening state is set again and the pipe member 2 is extracted. Thereafter, the pipe member 2 can be cut to a desired length and used for the bumper of the automobile 100.

Second Embodiment

Hereinafter, a second embodiment of the vehicle structure of the present invention will be described with reference to FIGS. 7 to 11B, but differences from the above-described embodiment will be mainly described, and a description of the same items will be omitted.

The present embodiment is the same as the first embodiment except that each flange portion has a different configuration.

Figure 7:
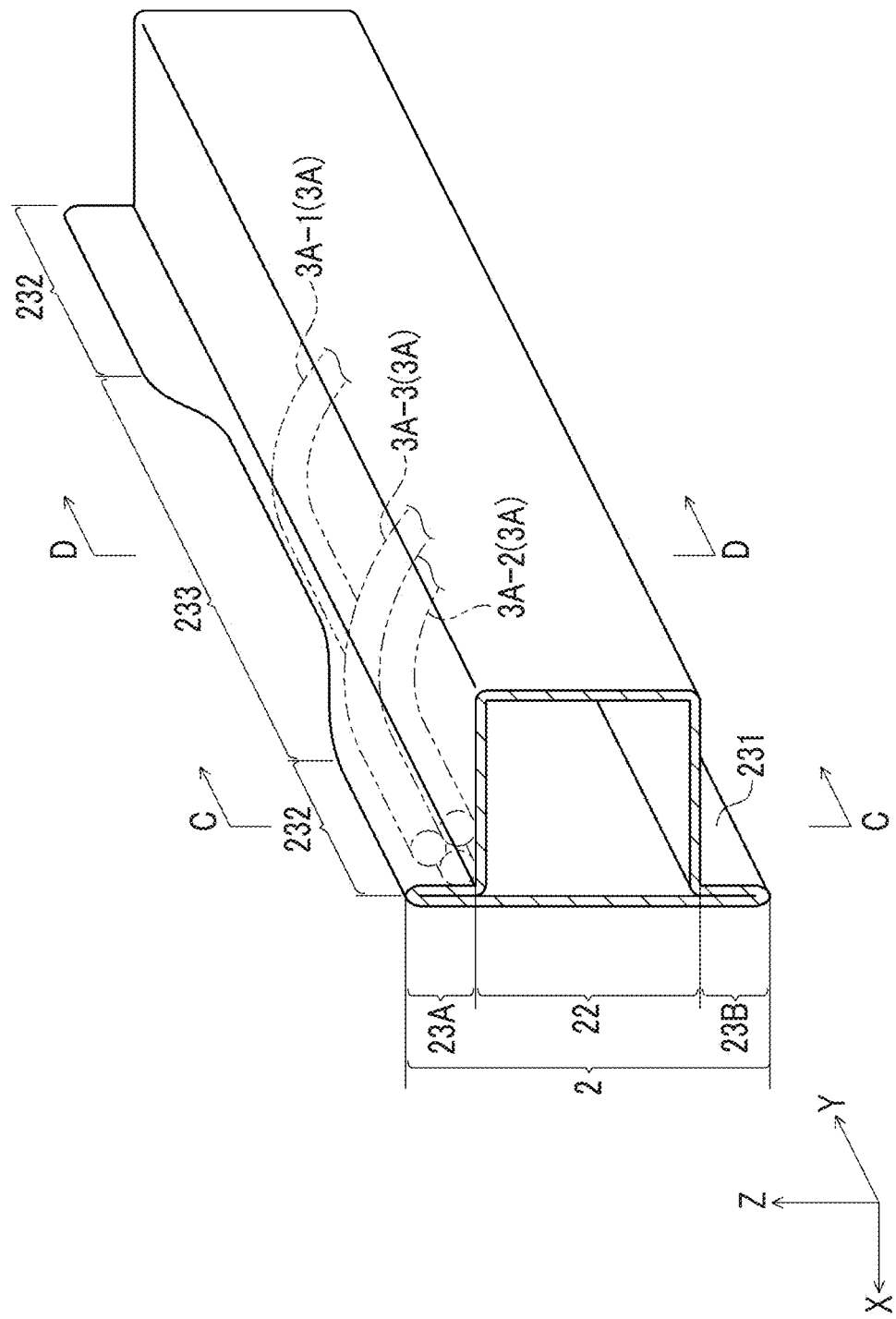
FIG. 7 is a perspective view showing a second embodiment of the vehicle structure of the present invention.
Figure 8:
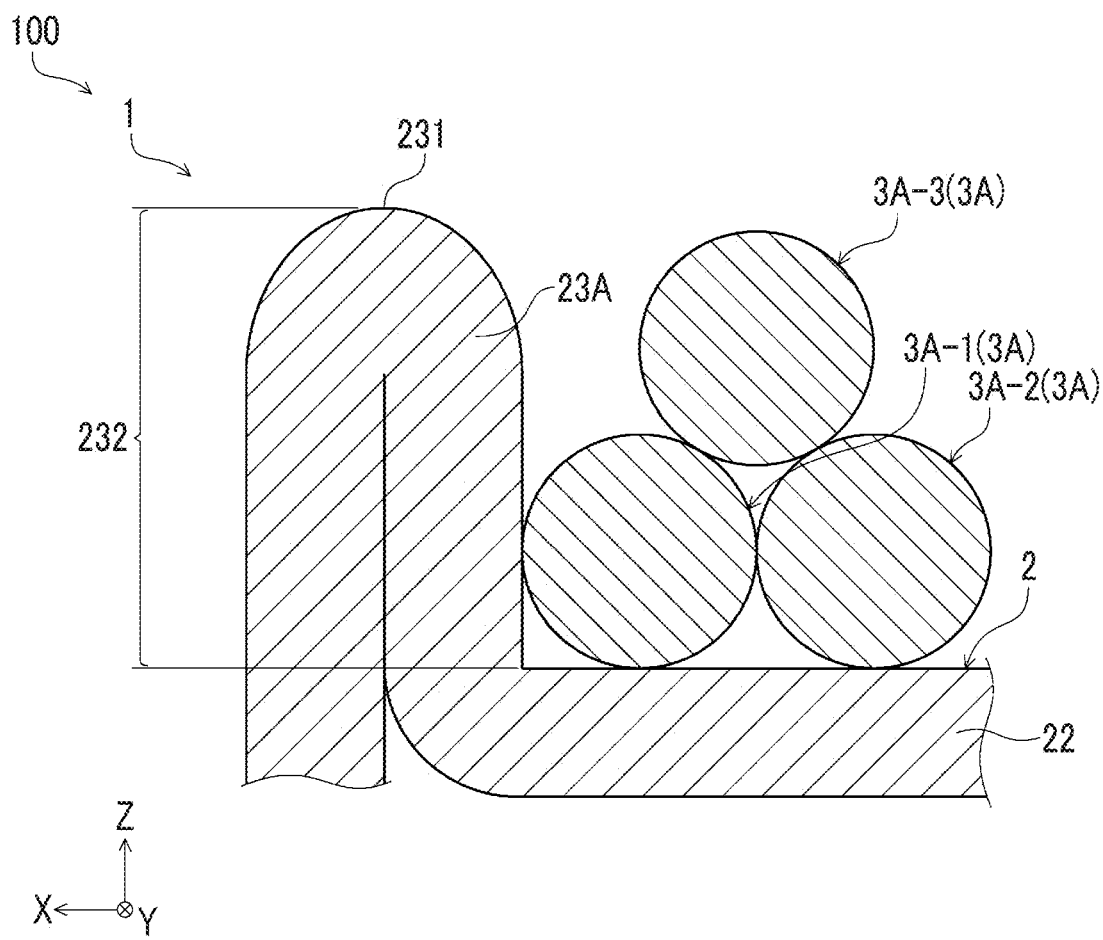
FIG. 8 is a cross-sectional view taken along line C-C in FIG. 7.
Figure 9:
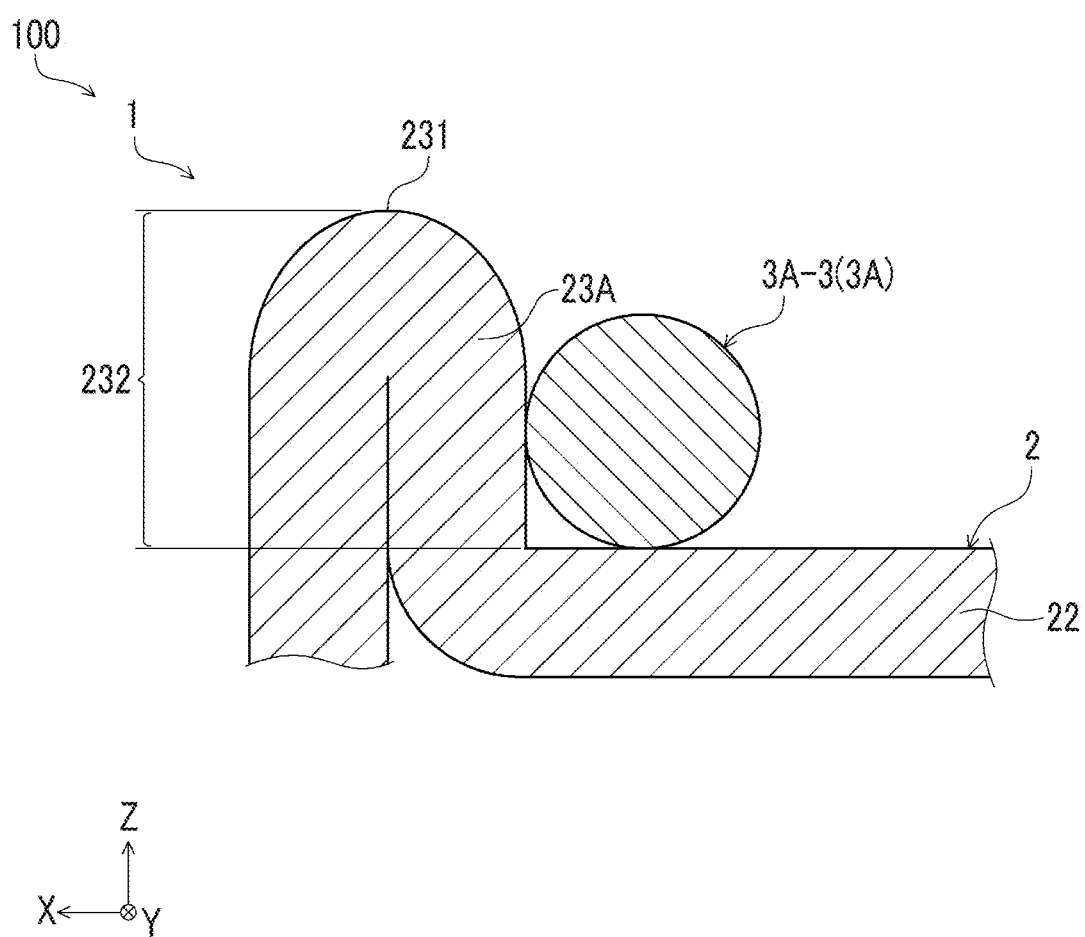
FIG. 9 is a cross-sectional view taken along line D-D in FIG. 7.

As shown in FIG. 7, in the present embodiment, the flange portion 23A includes two flange portions of which protrusion amounts (widths) from the outer peripheral portion of the pipe portion 22 are different from each other (the same also applies to the flange portion 23B). Namely, the flange portion 23A includes a first flange portion 232 having a large protrusion amount and a second flange portion 233 having a small protrusion amount. Here, in the present invention, "the small protrusion amount" also includes a case where the protrusion amount is zero.

Incidentally, in the configuration shown in FIG. 7, two first flange portions 232 are formed and one second flange portion 233 is formed between the two first flange portions 232, but the formation mode is not limited to this configuration.

In addition, three first wire-shaped bodies 3A are disposed in the first state outside the pipe portion 22. The first wire-shaped bodies 3A are referred to as a "first wire-shaped body 3A-1", a "first wire-shaped body 3A-2", and a "first wire-shaped body 3A-3".

Then, the first wire-shaped body 3A-1 to the first wire-shaped body 3A-3 are bundled and routed from the negative side toward the positive side in the Y-axis direction, the first wire-shaped body 3A-2 and the first wire-shaped body 3A-3 are collectively routed toward the negative side in the X-axis direction in the middle, and thereafter, the first wire-shaped body 3A-1 is additionally routed toward the negative side in the X-axis direction. Accordingly, the number of the first wire-shaped bodies 3A on the first flange portion 232 can be set to 3 (refer to FIG. 8), and the number of the first wire-shaped bodies 3A on the second flange portion 233 can be set to 1 (refer to FIG. 9).

As described above, the number of the first wire-shaped bodies 3A (total thickness) on the first flange portion 232 having a large protrusion amount is larger than the number of the first wire-shaped bodies 3A (total thickness) on the second flange portion 233 having a small protrusion amount. Accordingly, each of the first flange portion 232 and the second flange portion 233 can protect the first wire-shaped bodies 3A without excess or deficiency.

Next, a method for manufacturing the pipe member 2 will be described with reference to FIGS. 10, 11A and 11B.

In the manufacturing method, a shaping device 5B is used. Here, differences between the shaping device 5B and the shaping device 5A will be mainly described, and a description of the same items will be omitted. The shaping device 5B is the same as that of the first embodiment except that each of the upper die 51 and the lower die 52 has a different configuration. Incidentally, FIGS. 10, 11A, and 11B are cross-sectional views when the shaping device 5B is cut at two different locations in the middle of the pipe member 2 (base material 2') in the longitudinal direction.

The base material 2' includes a large-diameter portion 24 and a small-diameter portion 25 that are different in outer diameter and inner diameter from each other, along the longitudinal direction.

The upper die 51 and the lower die 52 share a first shaping portion 501 and a second shaping portion 502.

The first shaping portion 501 can shape the large-diameter portion 24 into the pipe portion 22 and the first flange portion 232 between the upper die 51 and the lower die 52.

The second shaping portion 502 can shape the small-diameter portion 25 into the pipe portion 22 and the second flange portion 233 between the upper die 51 and the lower die 52.

The shaping device 5B operates as follows.

Figure 10:
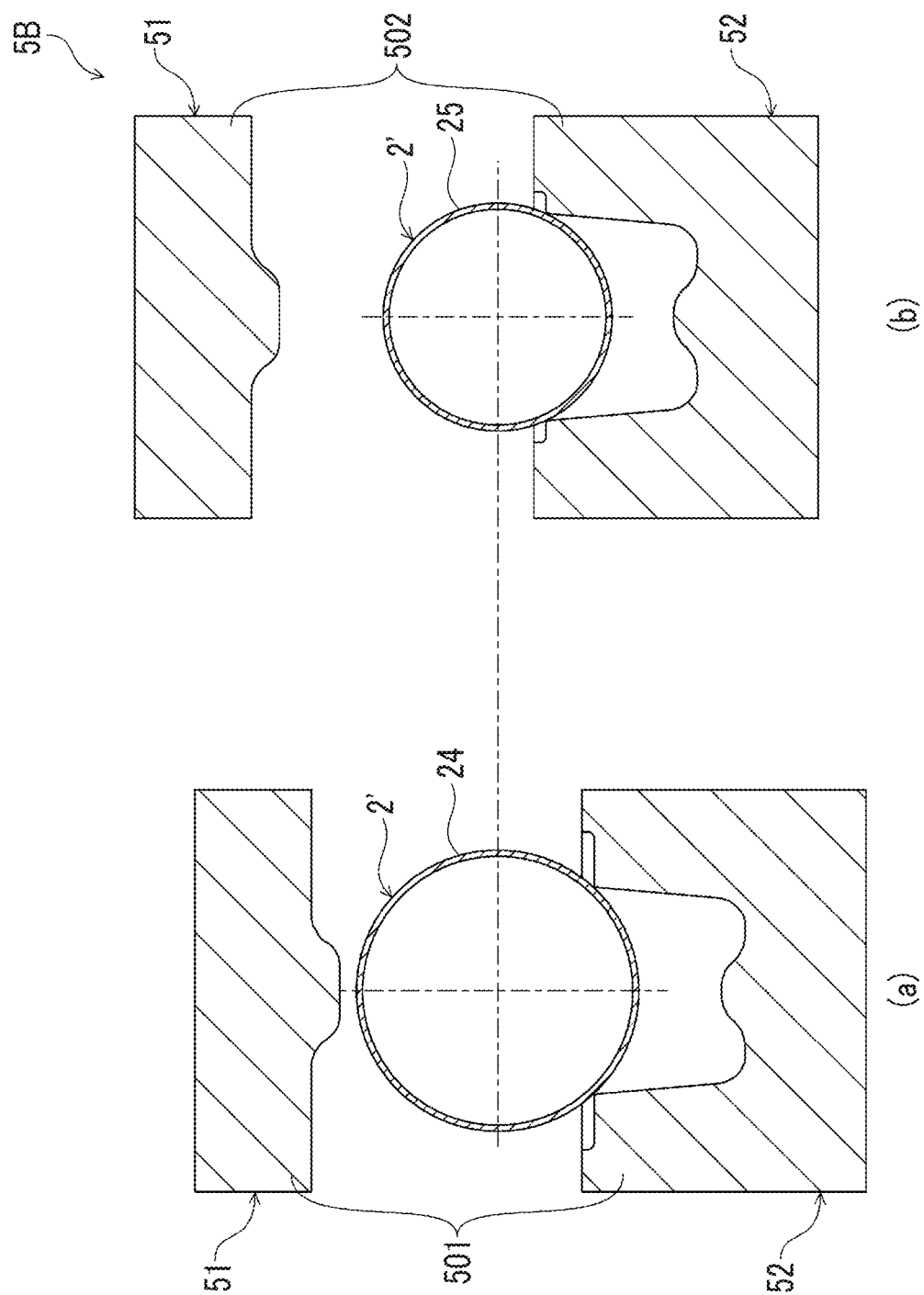
FIG. 10 is a view (die opening state) showing a process (one example) of manufacturing a pipe member included in the vehicle structure shown in FIG. 7, in order.
Figures 11A, 11B:
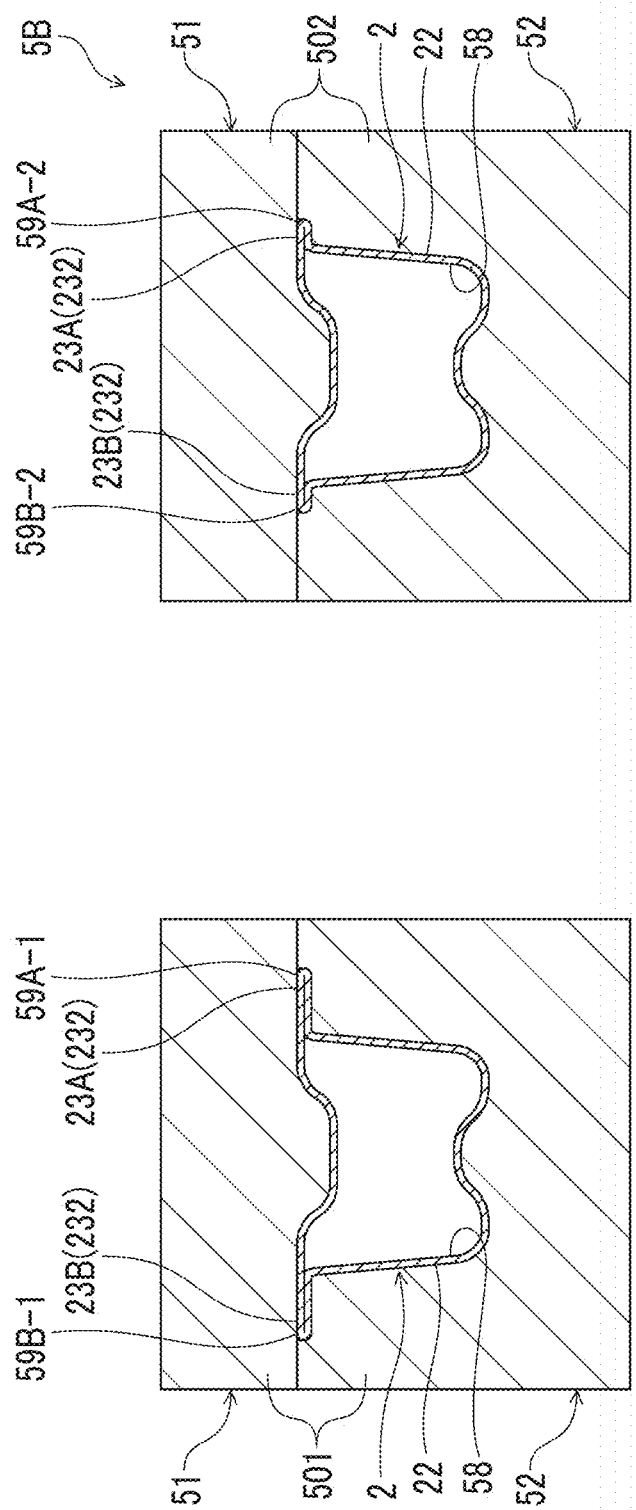
FIGS. 11A and 11B are views (die clamping state) showing the process (one example) of manufacturing the pipe member included in the vehicle structure shown in FIG. 7, in order.

First, as shown in FIG. 10, the upper die 51 and the lower die 52 are set to a die opening state, and the base material 2' is disposed between the upper die 51 and the lower die 52. In this case, the large-diameter portion 24 is disposed on the first shaping portion 501, and the small-diameter portion 25 is disposed on the second shaping portion 502.

Next, as described above, as shown in FIGS. 11A and 11B, the upper die 51 and the lower die 52 are set to a die clamping state while operating the gas supply portion 53, the heating portion 54, the cooling portion 55, and the drive unit 56.

In this case, in the first shaping portion 501, the first cavity 58 for shaping the pipe portion 22 and a second cavity 59A-1 and a second cavity 59B-1 for shaping the first flange portions 232 are defined. Accordingly, the pipe portion 22 and the first flange portions 232 are shaped.

On the other hand, in the second shaping portion 502, the first cavity 58 for shaping the pipe portion 22 and a second cavity 59A-2 and a second cavity 59B-2 for shaping the second flange portions 233 are defined. Accordingly, the pipe portion 22 and the second flange portions 233 are shaped.

Then, the die opening state is set again and the pipe member 2 is extracted. The pipe member 2 is a member including the first flange portions 232 and the second flange portions 233.

Third Embodiment

Hereinafter, a third embodiment of the vehicle structure of the present invention will be described with reference to FIGS. 12 to 14, but differences from the above-described embodiments will be mainly described, and a description of the same items will be omitted.

The present embodiment is the same as the first embodiment except that the application location of the vehicle structure in the automobile and a disposition state of the first wire-shaped body are different.

Figure 12:
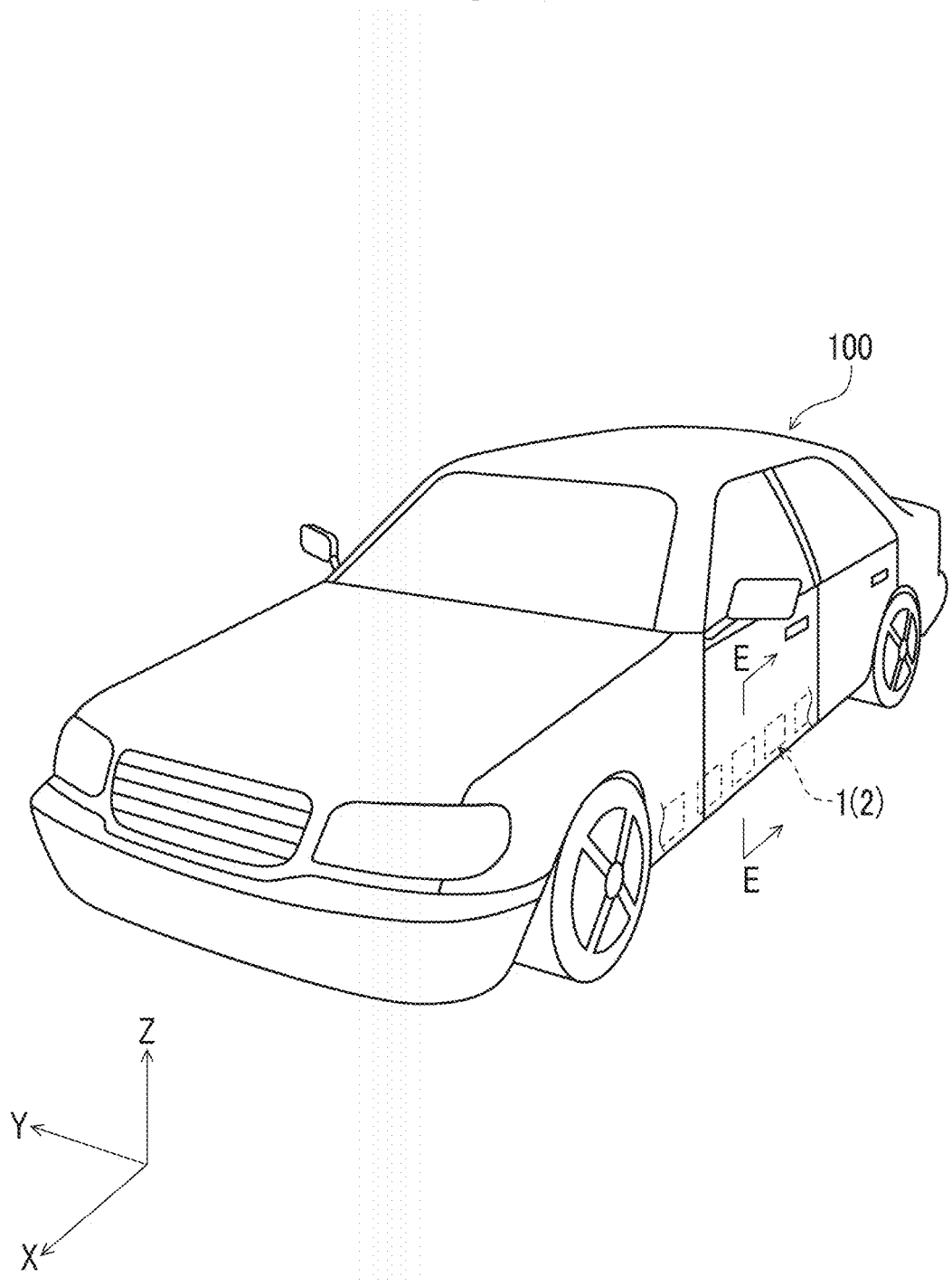
FIG. 12 is a perspective view showing one example of an automobile into which a vehicle structure (third embodiment) of the present invention is built.

As shown in FIG. 12, in the present embodiment, the vehicle structure 1 is disposed on a side lower portion of the automobile 100, and the pipe member 2 is applied to a side sill of the automobile 100.

Figure 13:
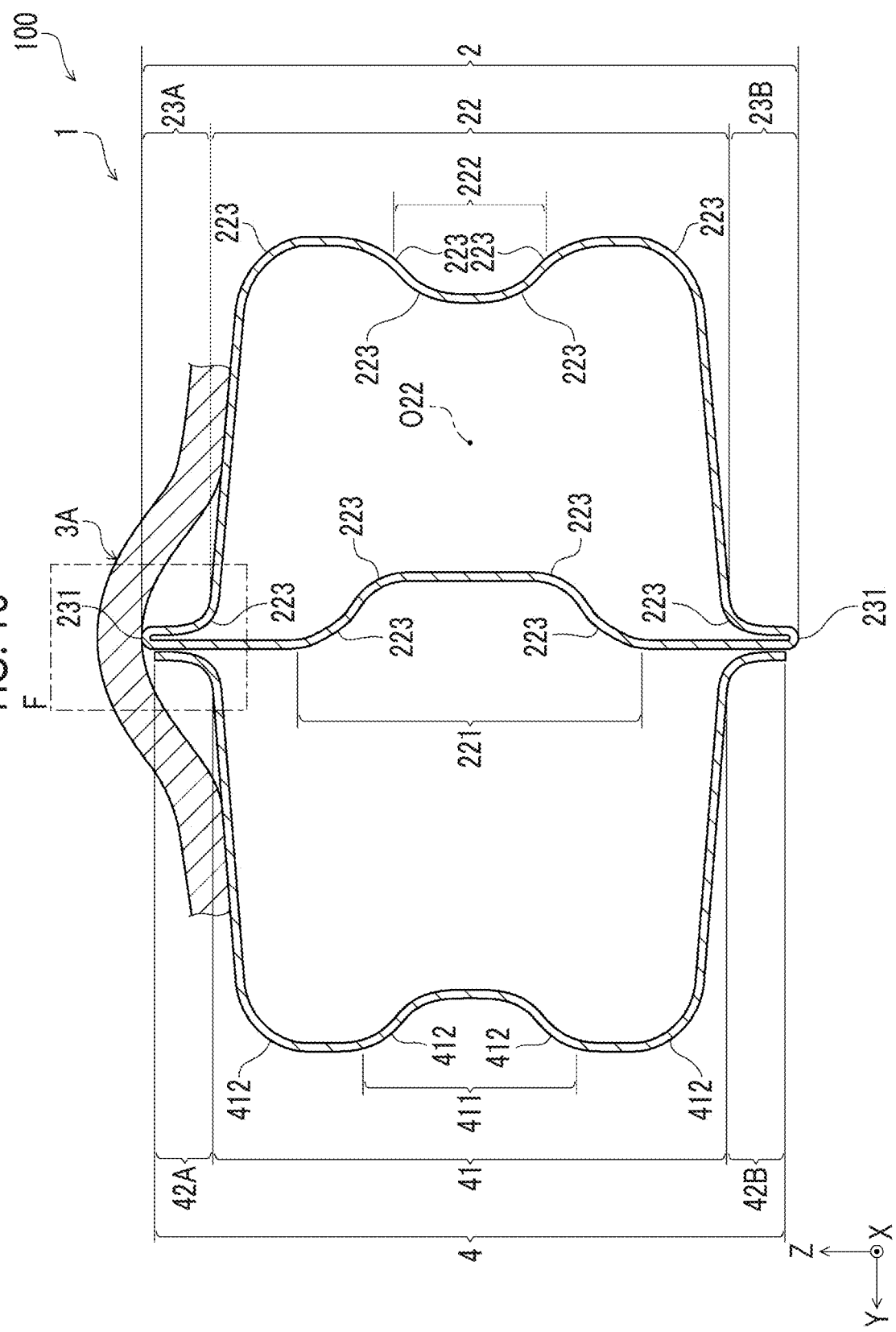
FIG. 13 is a cross-sectional view taken along line E-E in FIG. 12.
Figure 14:
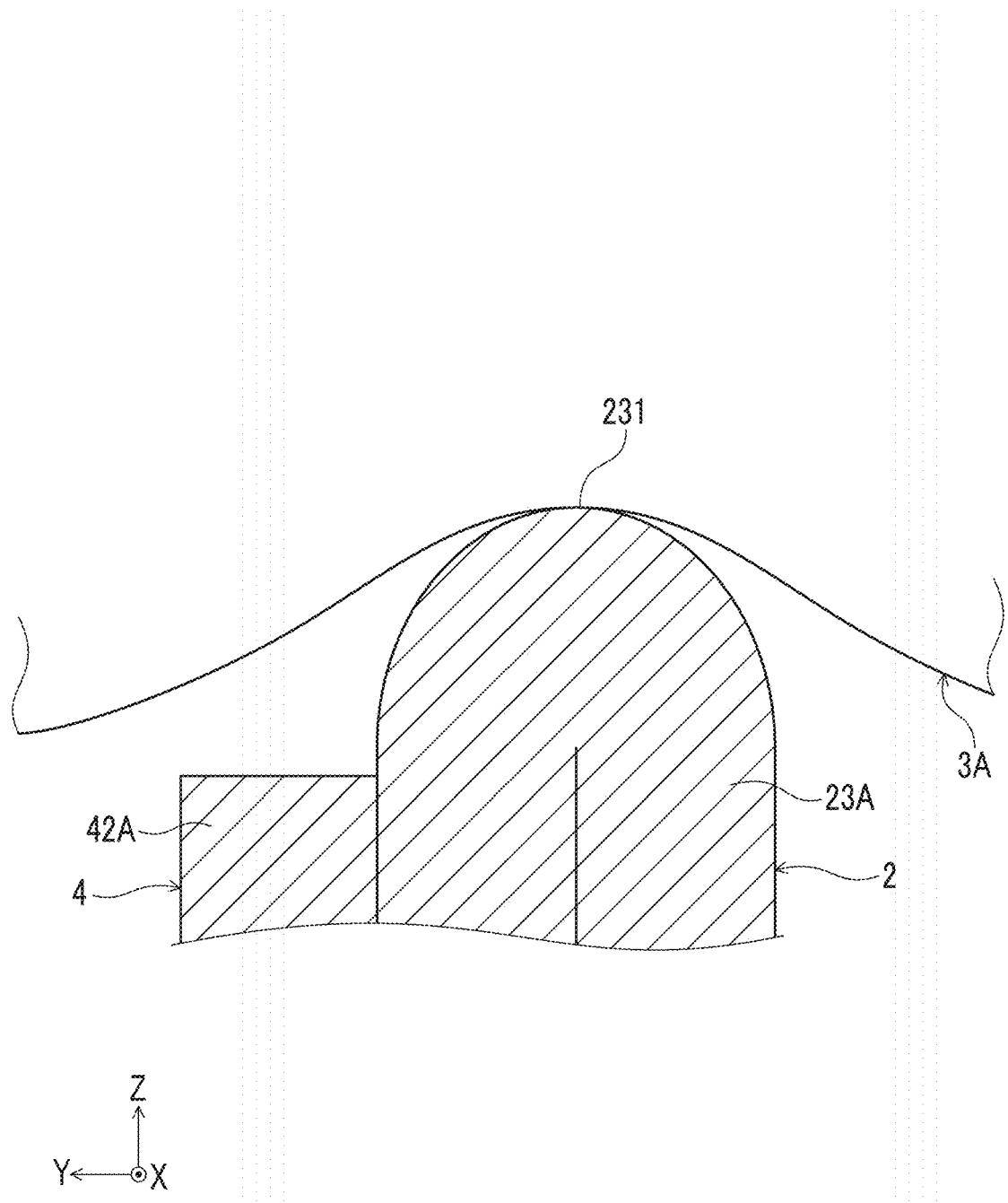
FIG. 14 is an enlarged view of a region [F] surrounded by an alternate long and short dashed line in FIG. 13.

As shown in FIG. 13, the vehicle structure 1 includes a reinforcement member 4 that reinforces the pipe member 2. The reinforcement member 4 is joined to the positive side of the pipe member 2 in the Y-axis direction, namely, to an inner side of the vehicle. The reinforcement member 4 is formed by bending a plate member, and includes a pipe shape forming portion 41 forming a pipe shape between the pipe shape forming portion 41 and the pipe member 2, a flange portion (bent portion) 42A formed by bending an upper edge portion of the pipe shape forming portion 41, and a flange portion (bent portion) 42B formed by bending a lower edge portion of the pipe shape forming portion 41.

The pipe shape forming portion 41 includes a recessed portion 411. The recessed portion 411 is recessed and deformed toward the negative side in the Y-axis direction and, similarly to the second recessed portion 222 of the pipe portion 22, is formed in a groove shape along the center axis O22 direction of the pipe portion 22. In addition, the pipe shape forming portion 41 includes a plurality of rounded portions 412 that are rounded on an outer side thereof.

The flange portion 42A is joined to the flange portion 23A of the pipe member 2, and the flange portion 42B is joined to the flange portion 23B of the pipe member 2. The joining method is not particularly limited and, for example, spot welding can be used. In addition, the flange portion 42A is lower than the flange portion 23A. Similarly, the flange portion 42B is lower than the flange portion 23B.

The first wire-shaped body 3A is disposed in at least one of the first state where the first wire-shaped body 3A is disposed along the flange portion 23A and the second state where the first wire-shaped body 3A strides over the flange portion 23A. As shown in FIGS. 13 and 14, in the present embodiment, the first wire-shaped body 3A is disposed in the second state outside the pipe portion 22 and accordingly, can stride over the flange portion 42A.

As described above, the flange portion 23A includes the end portion 231 that is rounded. Accordingly, even when the first wire-shaped body 3A is disposed in the second state, damage to the first wire-shaped body 3A caused by contact with the end portion 231 can be prevented. Therefore, in the vehicle structure 1, the first wire-shaped body 3A can be freely disposed regardless of the position on the pipe portion 22, namely, the degree of freedom in the disposition of the first wire-shaped body 3A with respect to the pipe member 2 is high.

In addition, as described above, the flange portion 42A is lower than the flange portion 23A, namely, has a smaller protrusion amount than that of the flange portion 23A. Accordingly, as shown in FIG. 14, even when the first wire-shaped body 3A is disposed in the second state, the first wire-shaped body 3A can be separated from the flange portion 42A. Therefore, damage to the first wire-shaped body 3A caused by contact with the flange portion 42A can be prevented.

Fourth Embodiment

Hereinafter, a fourth embodiment of the vehicle structure of the present invention will be described with reference to FIG. 15, but differences from the above-described embodiments will be mainly described, and a description of the same items will be omitted.

The present embodiment is the same as the third embodiment except that the vehicle structure has a different configuration.

Figure 15:
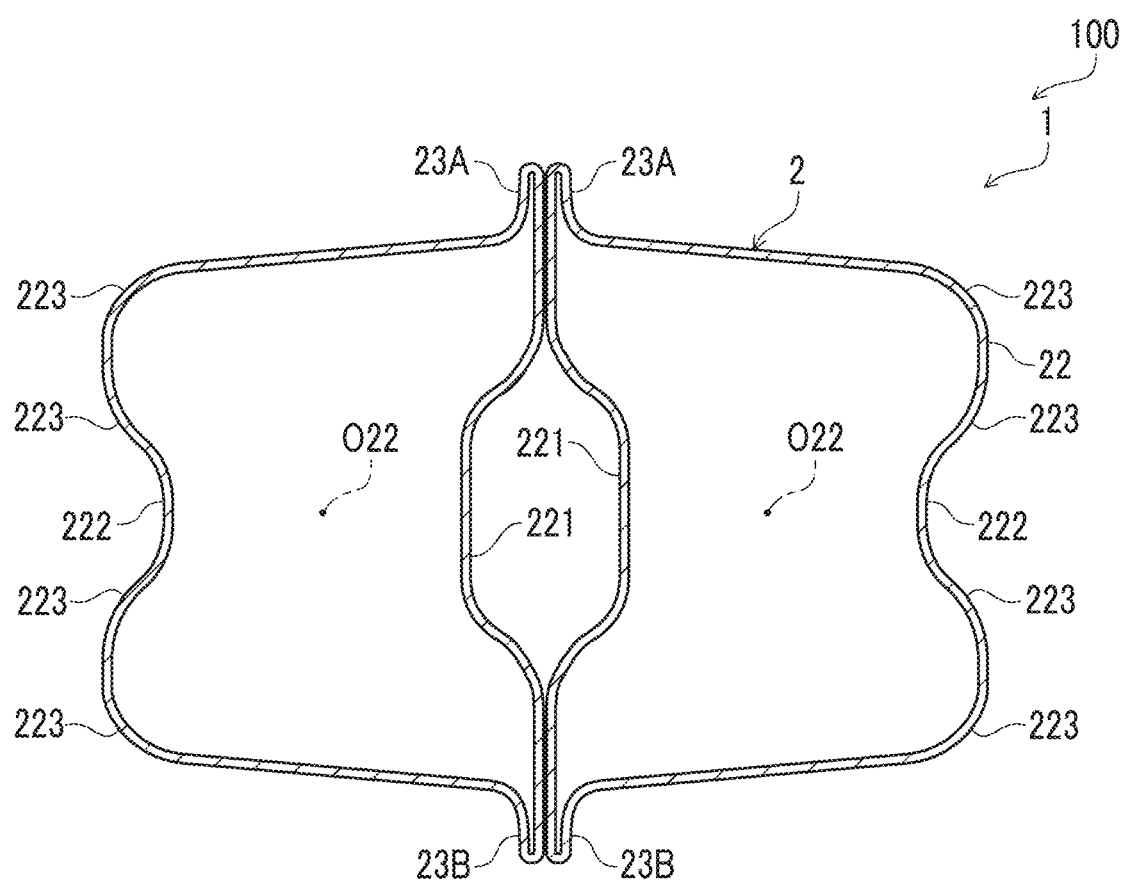
FIG. 15 is a cross-sectional view showing a fourth embodiment of the vehicle structure of the present invention.

As shown in FIG. 15, in the present embodiment, the vehicle structure 1 includes two pipe members 2. In the pipe members 2, one flange portion 23A and the other flange portion 23A are joined to each other, and one flange portion 23B and the other flange portion 23B are joined to each other. Accordingly, the pipe members 2 can reinforce each other. Therefore, the mechanical strength of the vehicle structure 1 can be increased.

Fifth Embodiment

Hereinafter, a fifth embodiment of the vehicle structure of the present invention will be described with reference to FIG. 16, but differences from the above-described embodiments will be mainly described, and a description of the same items will be omitted.

The present embodiment is the same as the fourth embodiment except that the pipe member has a different configuration (cross-sectional shape).

Figure 16:
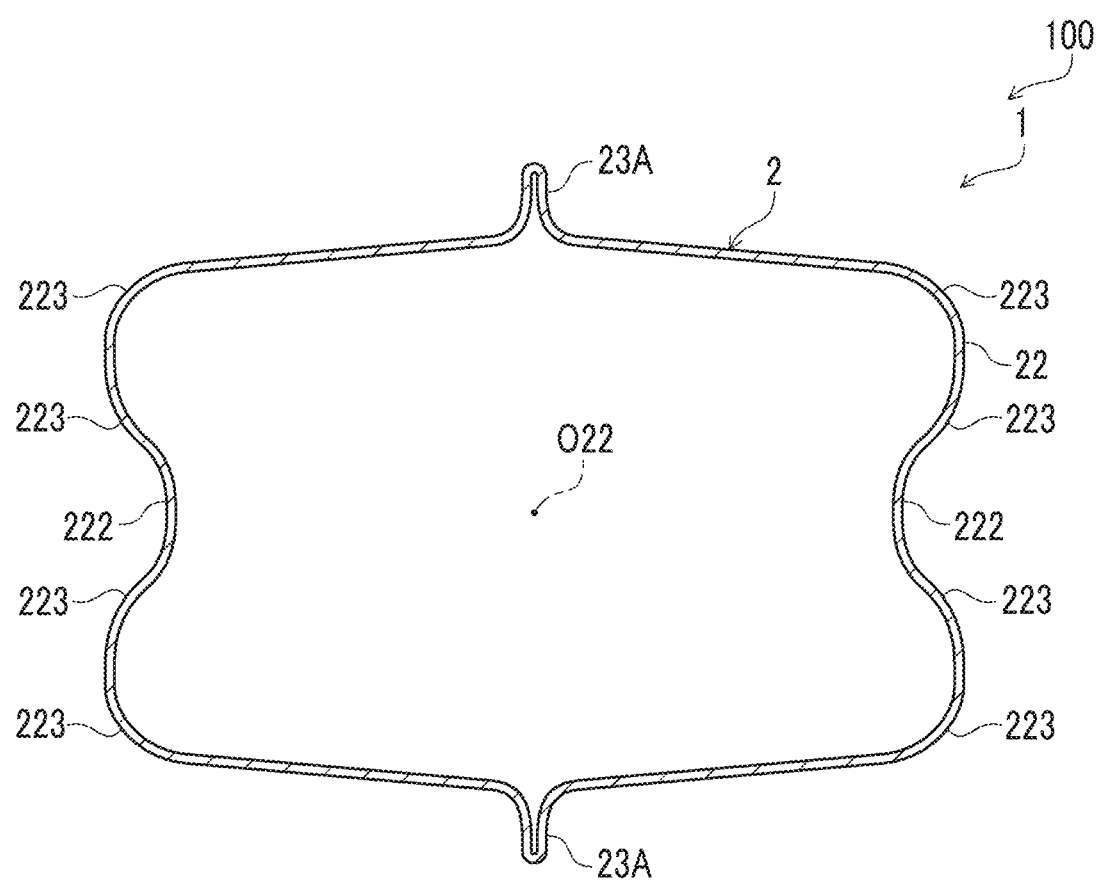
FIG. 16 is a cross-sectional view showing a fifth embodiment of the vehicle structure of the present invention.

As shown in FIG. 16, in the present embodiment, the pipe member 2 has a form in which the two pipe members 2 in the fourth embodiment are formed of one member. In this case, the flange portion 23A and the flange portion 23B each are formed at central portions of the pipe portion 22 in the Y-axis direction. With such a configuration, the mechanical strength of the pipe member 2 is increased by the amount that the size of the pipe portion 22 is expanded.

The illustrated embodiments of the vehicle structure of the present invention have been described above, but the present invention is not limited to the embodiments, and each portion forming the vehicle structure can be replaced with any configuration capable of exhibiting the same function. In addition, any component may be added.

In addition, the vehicle structure of the present invention may be a combination of any two or more configurations (features) in each of the embodiments.

In addition, the vehicle structure 1 is mounted and used in the passenger vehicle in each of the embodiments, but the present invention is not limited thereto, and the vehicle structure 1 can also be mounted and used in vehicles other than the passenger vehicle. The other vehicles are not particularly limited and examples thereof include a construction vehicle such as a dump vehicle or an excavator, a vehicle for passenger railway or freight railway, and the like.

In addition, the number of the pipe members included in the vehicle structure is 1 or 2 in each of the embodiments, but the number of the pipe members is not limited thereto and may be, for example, 3 or more. In addition, the pipe member mounted in the passenger vehicle is applied to a bumper reinforcement or a side sill in each of the embodiments, but the pipe member is not limited to this application and is applicable to, for example, a side roof rail or a steering member (instrument panel reinforcement).

In addition, the number of the wire-shaped bodies included in the vehicle structure is 1 or 2 in each of the embodiments, but the number of the wire-shaped bodies is not limited thereto and may be, for example, 3 or more. In addition, the formation number of the flange portions included in the pipe member is not limited to 2 in each of the embodiments and may be, for example, 1 or 3 or more.

In addition, the wire-shaped body is disposed in one of the first state and the second state in each of the embodiments, but the wire-shaped body is not limited thereto and may be disposed in a state including both the first state and the second state.

It should be understood that the invention is not limited to the above-described embodiment, but may be modified into various forms on the basis of the spirit of the invention. Additionally, the modifications are included in the scope of the invention.

What is claimed is:

1. A vehicle structure comprising:
   a pipe member forming a part of a frame of a vehicle; and
   a wire-shaped body having flexibility,
   wherein the pipe member includes a pipe portion forming a pipe shape and a flange portion formed to protrude from the pipe portion, and is formed of one member in which the pipe portion and the flange portion are continuous with each other, and
   the wire-shaped body is disposed in a state where the wire-shaped body is in contact with the flange portion and strides over the flange portion.

2. The vehicle structure according to claim 1,
   wherein the wire-shaped body is disposed in a state outside the pipe portion.

3. The vehicle structure according to claim 1,
   wherein the wire-shaped body is disposed in a state inside the pipe portion.

4. The vehicle structure according to claim 1,
   wherein the flange portion is formed along a center axis direction of the pipe portion.

5. The vehicle structure according to claim 4,
   wherein a recessed portion which is formed in a groove shape is formed in the pipe portion along the center axis direction of the pipe portion.

6. The vehicle structure according to claim 5,
   wherein two recessed portions are formed by being recessed in opposite directions.

7. The vehicle structure according to claim 4,
   wherein a protrusion amount of the flange portion is in a range of from a smaller one of 0.5 times a thickness of a pipe wall of the pipe member and 1 mm to 20 times the thickness.

8. The vehicle structure according to claim 4,
   wherein a protrusion amount of the flange portion is in a range of from a smaller one of 0.01 times a maximum value of a width of the pipe portion along a protruding direction of the flange portion and 1 mm to 1 time the maximum value.

9. The vehicle structure according to claim 1,
   wherein two flange portions are formed to protrude in opposite directions.

10. The vehicle structure according to claim 1,
    wherein the flange portion is rounded along a circumferential direction of the pipe member.

11. The vehicle structure according to claim 10,
    wherein the wire-shaped body is disposed in a state outside the pipe portion, and
    a highest point of the wire-shaped body is the same as or lower than a height of a rounded portion.

12. The vehicle structure according to claim 1,
    wherein the flange portion includes a first flange portion having a large protrusion amount and a second flange portion having a small protrusion amount, and
    a thickness or the number of the wire-shaped bodies on the first flange portion is larger than a thickness or the number of the wire-shaped bodies on the second flange portion.

13. The vehicle structure according to claim 1, further comprising:
    a reinforcement member joined to the pipe member to reinforce the pipe member,
    wherein the reinforcement member includes a pipe shape forming portion forming a pipe shape between the pipe shape forming portion and the pipe member, and a bent portion formed by bending an edge portion of the pipe shape forming portion, and
    the wire-shaped body strides over the bent portion.

14. The vehicle structure according to claim 13,
    wherein the bent portion has a smaller protrusion amount than a protrusion amount of the flange portion.

15. The vehicle structure according to claim 14,
    wherein the bent portion is joined to the flange portion.

16. The vehicle structure according to claim 15,
    wherein a recessed portion which is formed in a groove shape is formed in the pipe shape forming portion along a center axis direction of the pipe portion.

17. The vehicle structure according to claim 1,
    wherein the pipe member is used in the vehicle in a state where a protruding direction of the flange portion faces upward or downward.

* * * * *